United States Patent [19]
Greenstein et al.

[11] Patent Number: 6,131,016
[45] Date of Patent: Oct. 10, 2000

[54] METHOD AND APPARATUS FOR ENHANCING COMMUNICATION RECEPTION AT A WIRELESS COMMUNICATION TERMINAL

[75] Inventors: Lawrence Joel Greenstein, Edison; Nelson Ray Sollenberger, Tinton Falls, both of N.J.

[73] Assignee: AT&T Corp, New York, N.Y.

[21] Appl. No.: 08/920,138

[22] Filed: Aug. 27, 1997

[51] Int. Cl.[7] ....................................... H04Q 7/38
[52] U.S. Cl. ................. 455/69; 455/59; 455/562
[58] Field of Search ...................... 455/504, 506, 455/522, 59, 62, 69, 561, 503, 70, 68, 562; 370/203, 208, 210, 330, 334, 348, 525, 337, 347; 375/299

[56] References Cited

U.S. PATENT DOCUMENTS

| | | | |
|---|---|---|---|
| 4,613,990 | 9/1986 | Halpern | 455/69 |
| 5,134,630 | 7/1992 | Bateman | 455/46 |
| 5,228,062 | 7/1993 | Bingham | 375/344 |
| 5,459,873 | 10/1995 | Moore et al. | 370/334 |
| 5,551,070 | 8/1996 | Sharby et al. | 455/119 |
| 5,628,052 | 5/1997 | DeSantis et al. | 455/562 |
| 5,642,353 | 6/1997 | Roy, II et al. | 370/329 |
| 5,678,213 | 10/1997 | Myer | 455/303 |
| 5,724,666 | 3/1998 | Dent | 455/562 |
| 5,787,122 | 7/1998 | Suzuki | 375/299 |
| 5,828,658 | 10/1998 | Ottersten et al. | 370/310 |
| 5,884,171 | 3/1999 | Tanabe et al. | 455/434 |
| 5,933,454 | 8/1999 | Cioffi | 375/356 |
| 6,005,876 | 12/1999 | Cimini, Jr. et al. | 370/525 |

Primary Examiner—William G. Trost
Assistant Examiner—Jean A Gelin

[57] ABSTRACT

A system provides transmit diversity with feedback to enhance the reception of communication signals at a wireless communication terminal. Multiple antennae are provided at the base station. The multiple antennae transmit multi-carrier information signals such as OFDM including pilot tones. The wireless communication terminal receives the pilot tones and performs processing on those tones to detect the relationship between the information signals transmitted from the various antennae of the base station. A feedback signal, based on the comparison of the pilot tones communicates back to the base station information about the channels of the respective transmit antennae to the terminals. The base station modifies the transmission processing associated with the various transmit antennae based upon the feedback signal. The modified processing improves the reception of the information signals at the wireless communication terminal.

17 Claims, 2 Drawing Sheets

METHOD AND APPARATUS FOR ENHANCING COMMUNICATION RECEPTION AT A WIRELESS COMMUNICATION TERMINAL

BACKGROUND OF THE INVENTION

The present invention is directed to a method and system for providing enhanced communication reception at a wireless communication terminal. More particularly, the invention is directed to a method and a system for providing transmit diversity and feedback to the transmitting station from the receiving wireless communication terminal.

The benefits of wireless communication are well known. In most circumstances, wireless communication is thought of as being particularly beneficial with regard to parties who are mobile. However, it has also been proposed to provide wireless communication paths from transmitting base stations to fixed wireless sites as an alternative to land line connections. Whether in the mobile or fixed environment, wireless communications entail the transmission of communication signals through the air and those signals may suffer transmission degradation problems that arise, such as fading or phase displacement due to the geographical terrain.

It would be beneficial to provide a mechanism to enhance communication reception at a wireless communication terminal. One possibility would be to provide multiple antennae at the wireless communication terminal for providing what is commonly referred to as receiver diversity. The multiple antennae could be positioned in different manners so as to receive signals along different air "channels" in an attempt to improve the overall reception at the wireless communication terminal. One problem of receiver diversity is the expense involved in providing multiple antennae for the terminal. It would therefore be beneficial to have improved communications of the sort achievable with receiver diversity while avoiding the costs of supplying multiple receiver antennae.

SUMMARY OF THE INVENTION

The present invention enhances wireless communication reception at a wireless communication terminal without the need for providing multiple receiver antennae. In accordance with an embodiment of the present invention, the benefits of receiver diversity are achieved by providing transmit diversity, that is, transmission along multiple antennae at the transmitting base station. The transmit diversity can be combined with ordinary receive diversity. The transmit diversity is combined with the transmission of a multi-carrier tone signal such as an orthogonal frequency division multiplexing (OFDM) signal that includes one or more pilot tones. The pilot tones are supplied to signals transmitted on two or more of the base station antennae. The pilot tones are then detected at the wireless communication terminal. A processor at that terminal compares the received pilot tones. The terminal then sends a feedback signal back to the base station. The feedback signal is based on the detected relationship between the pilot tones. The base station utilizes the feedback signal to modify the transmission of the multicarrier tone signal along the multiple antennae so as to maximize or enhance the reception of the information signals at the wireless communication terminal.

In one embodiment of the present invention the base station performs selection diversity, that is selects some subset of the multiple antennae for transmitting the information signals to the wireless communication terminal rather than using all of the available antennae.

In a second embodiment the feedback signal is used to control an adjustment of processing of the signals to be transmitted by at least one of the antenna so as to provide equal gain and co-phasing of the pilot tones from the multiple antennae.

In yet a third processing option, the feedback arrangement provides for maximal ratio combining with respect to the multiple transmit antennae.

The present invention therefore provides an enhancement of the reception of communication signals at the receiver by using multi-carrier tone transmit diversity with feedback.

DETAILED DESCRIPTION

Figure 1:
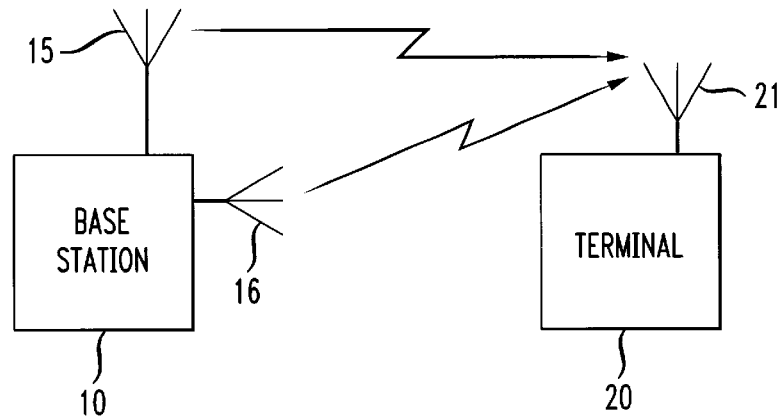
FIG. 1 illustrates a block diagram of elements of a system in accordance with an embodiment of the present invention.

The present invention takes advantage of transmit diversity along with the characteristics of orthogonal frequency division multiplexing (OFDM) and feedback signals from a wireless communication terminal to adjust the transmission operation to optimize communication reception for that terminal. FIG. 1 illustrates a block diagram of elements of the system that provides this enhanced communication. In particular, a base station 10 includes two transmission antennae 15 and 16. A wireless communication terminal 20 is located within a cell serviced by the base station. The base station is connected to a wireless communication network which is not shown. The terminal 20 has an antenna 21. Each transmission antenna is arranged such that diverse communication channels are provided to the terminal.

Figure 3:
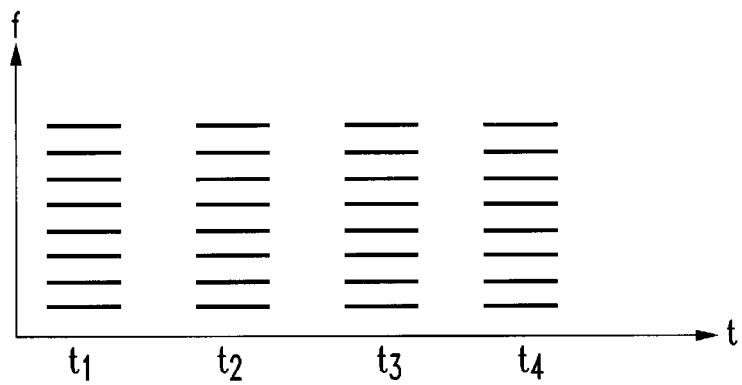
FIG. 3 is a plot of frequency versus time showing samples of a multi-carrier signal.

In accordance with an embodiment of the present invention the base station creates transmission signals comprising multi-carrier tones which can for example be OFDM signals. The multi-carrier tones comprise a plurality of carrier frequencies which are transmitted substantially at the same time. An example of such a multi-carrier signal is illustrated in the frequency-versus-time plot shown in FIG. 3 where a plurality of frequencies are transmitted at each of times t1, t2, t3, and t4. These tones constitute carrier tones for carrying communication information. That information can take the form of voice communications or data communications.

In an expected implementation a plurality of terminals 20 would be positioned within the cell or region served by base station 10. They would all receive the same multi-carrier tone signal transmitted from antennae 15 and 16 of base station 10. Because they would receive the signal over different air paths, the received signals would not likely be identical. Each terminal would be interested in only a sub-set or cluster of the entire bandwidth of tones. The remainder of this explanation of an embodiment of the invention will focus on the relationship between the base station and one of the plurality of terminals and thus one of the clusters of tones. In this case, the cluster still constitutes a multi-carrier tone signal.

In connection with the present invention, each transmission antenna is provided with a multi-carrier tone signal. The signal on any given antenna could be constituted by a subset of the cluster of tones which are of interest to the terminal 20 in question. Alternatively, both antennae could carry all of the carrier tones within the cluster. Within the tone cluster one tone is selected as a pilot tone. A first pilot tone is transmitted by the first antenna 15 while a second pilot tone is transmitted amongst the tones transmitted by antenna 16. When terminal 20 receives signals from both transmit antenna 15 and transmit antenna 16 the received signals would include the pilot tones transmitted from each of the two antennae. Alternatively a single pilot tone can be time multiplied over the respective antennae.

The terminal performs a pilot tone processing operation. This processing operation entails an analysis of the pilot tones received from their respective transmit antennae. The processing operation then provides information for a feedback signal that is transmitted from the terminal 20 back to base station 10. This feedback signal is then used by the signal processing components of the base station to adjust the information signals, that is the non-pilot tones within the tone cluster, that are transmitted via transmission antennae 15 and 16 so as to enhance the reception of those signals at the terminal 20.

It should be noted that when considering communications to a fixed wireless terminal the channel remains fairly constant over time. Thus, there is the notion of "slow fading". The present invention can take advantage of this by doing pilot tone analysis over multiple signal frames. In that case the pilot tones can be sent out in successive transmissions of the multi-carrier signal.

Further details regarding the processing of the signals both in the base station and in the terminal will now be described.

Figure 2A:
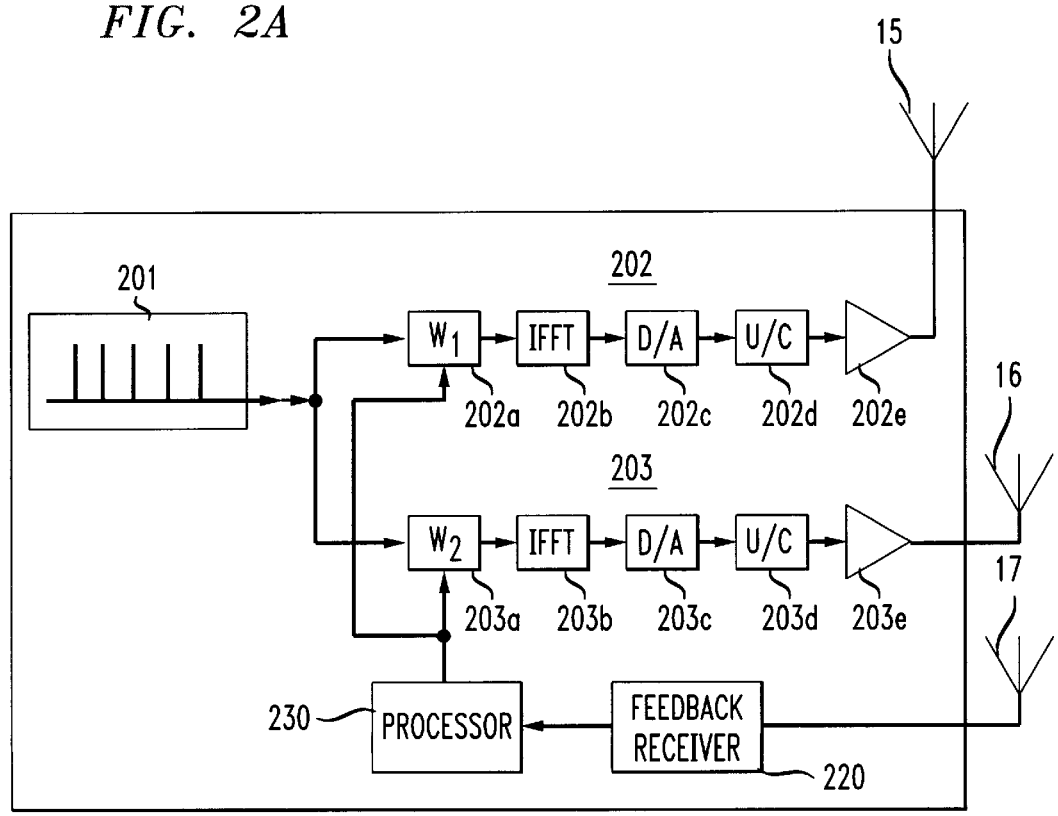
FIG. 2A illustrates a block diagram of an example of a base station of FIG. 1.

FIG. 2A illustrates, in block diagram form, an example of a base station processing circuitry which could be utilized in connection with the present invention. Data to be transmitted to a wireless communication terminal is provided by a complex data source 201. The data can be supplied to two different transmit processing circuits 202 and 203. For purposes of this embodiment the individual transmit processing circuits are of the same general construct. This is not a requirement of the invention. In the illustrated embodiment both processing circuits include signal weighting devices 202a and 203a; both include fast fourier transform (FFT) devices 202b and 203b; both include digital to analog converters (D/A) 202c and 203c; both include uplink converters (U/C) 202d and 203d; and both include transmission amplifiers 202e and 203e. These circuits are then connected to respective antennae 15 and 16.

The base station also includes a receive antenna 17 which is coupled to a feedback receiver 220. A processor 230 is connected to the feedback receiver and to the two transmission processing circuits 202 and 203. In the embodiment shown, the processor is coupled to the weighting circuits 202A and 203A specifically. However, one of ordinary skill in the art should recognize that the processor could be coupled to the transmission circuits 202 and 203 in alternative manners to achieve the processing adaptations described below.

In connection with the embodiment of the base station illustrated in FIG. 2A, the transmission processing circuits 202 and 203 create OFDM signals which are to be transmitted via transmit antennae 15 and 16 respectively. Both antennae transmit a plurality of tones including a pilot tone. The feedback receiver receives a feedback signal transmitted from the wireless communication terminal. Various levels of complexity with respect to such feedback signal are possible.

The feedback signal could constitute a control signal generated by the terminal which is then passed to the processor to direct the processor for effecting appropriate adaptation of the transmission signals through transmission processing circuits 202 and 203. Alternatively, the feedback signal received by the feedback receiver could constitute information (e.g., amplitude and/or phase) regarding the pilot tones transmitted by the respective transmission antennae. The processor 230 could then operate upon the information defining the characteristics of the pilot tones and derive its own processing requirements for the transmission processing circuitry 202 and 203.

In the embodiment that will be described with respect to FIG. 2B, it would be assumed that the terminal does the complex processing with respect to the pilot tones and passes a control signal back to the base station. However, those of ordinary skill in the art would understand that such complex processing operations could be performed at the base station rather than the terminal.

Figure 2B:
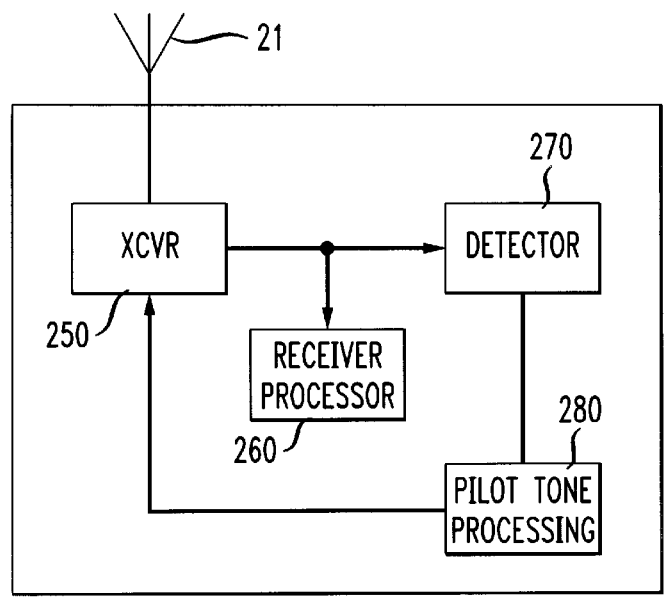
FIG. 2B illustrates a block diagram of an example of a wireless communication terminal of FIG. 1.

FIG. 2B illustrates an example of a wireless communication terminal in connection with an embodiment of the present invention. An antenna 21 receives the transmission signals sent by antennae 15 and 16. The signals are passed to a transceiver 250. In this particular embodiment the transceiver passes the received signal to both a receiver processor 260 and a detector demodulator 270. The detector sorts out the pilot tones from the received plurality of tones and passes those pilot tones to pilot tone processing circuit 280. This would be achieved by processing the pilot tones after diversity combining (that is combining of received signals). One of ordinary skill in the art should appreciate that this could be combined with receiver diversity (that is multiple antennae at the receiver) to further improve reception. The received processor may process all of the received carrier tones to derive the information which is transmitted in the cluster of tones associated with that terminal. Thus, a given signal constituting a cluster of tones including a pilot tone can include information on the non-pilot tones. This provides a tremendous advantage in that it allows the transmission of information to the terminal in parallel with signal processing with respect to improving signal reception.

The pilot tone processing circuit 280 can perform any one of a number of different possible analyses with respect to the pilot zones received from the respective antennae. The following will provide a description of three possible processing operations and related feedback signals which are then sent by the pilot tone processing circuit to transceiver 250 and then via antenna 21 back to antenna 17 of the base station. Other processing circuits could be easily determined by those skilled in the art interested in analyzing the transmission characteristics of signals from the transmission antenna of the base station.

In a first processing operation the pilot tone processing circuit at the receiving terminal compares the strengths of successive received pilot tones and determines which of the channels, that is the air channels associated with the respective transmit antennae, is currently carrying the stronger pilot tone. The terminal can then send back information to the base station to select one of the transmit antennae. For instance, in a two transmit antenna arrangement, the terminal could send back a single bit of information such that the processing circuit understands which of the two transmit antennae the terminal detects best. The processor 230 would then operate on this information so as to select one transmission processing circuit and "de-select" or turn off the other transmission processing circuit with respect to the cluster of tones intended for that wireless communication terminal. This is referred to as selection diversity. Rather than zeroing one of the weighting circuits 202a or 203a, the selection diversity embodiment could employ a selection switch anywhere along the transmission processing chain whereby the processor could select one switch and deselect the other switch in response to the feedback signal from the receiver terminal.

In a second embodiment a downlink receiver or terminal performs differential phase detection of successive received pilot tones. The feedback signal then constitutes quantized information about the relative phases of the two channels. If the pilot tone processing circuitry quantizes phase into K uniformly spaced values, it sends back $\log_2 K$ bits. The base station processor, upon receiving this information via the feedback receiver can then adjust the weights w1 and/or w2 to co-phase the downlink tones at the receiver. A good practical choice for K is 4, that is 4-DPSK downlink detection of successive pilot tones and 2 bits of information transmitted uplink. That way w1 can be fixed (1) and w2 is either 1, j, −1 or −j corresponding to phase rotations of 0°, 90°, 180°, or 270° respectively. This keeps the processing simple. Moreover, the downlink co-phasing is nearly as good as ideal co-phasing, that is received power is within 0.7 dB of ideal under all fading conditions.

A third example of processing which could be performed at the terminal device is referred to as maximal ratio combining. In this circumstance, the downlink receiver measures both relative amplitude and relative phase of successive pilot tones and sends that information back on the uplink to the base station. The processing circuitry within the base station then can set both $w_1$ and $w_2$ in both amplitude and phase so as to maximize the downlink received power for a given transmit power. This is likely to provide the best diversity characteristics, but is the most complex with regard to the information that needs to be processed and the information which must be transmitted uplink.

The above processing techniques provide feedback to the transmitting base station about the over-the-air channels which are encountered by transmit antenna 15 and transmit antenna 16 respectively. The feedback signals then provide appropriate information to establish adapted transmission processing circuitry criteria so as to improve the reception characteristics at the terminal 20.

Figure 4:
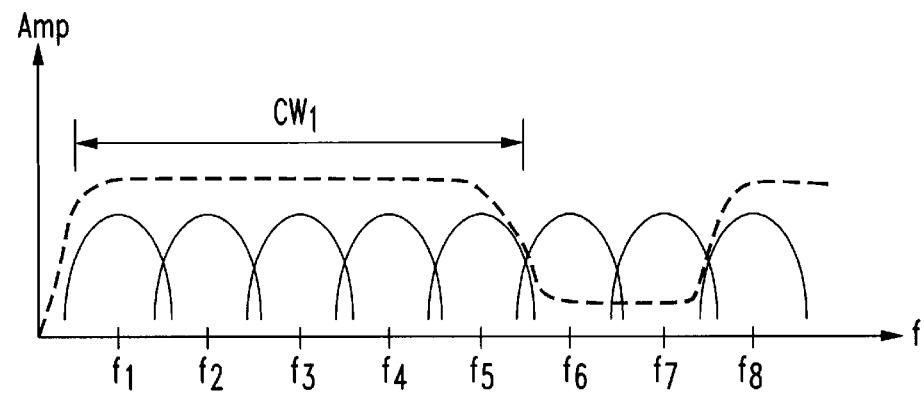
FIG. 4 provides a plot of amplitude versus frequency with respect to a subset of the multi-carrier frequencies.

It may so happen that within a correlation bandwidth (a bandwidth over which correlation in the fading characteristics is 0.7 or higher) for a given channel with respect to a cluster of tones directed to a given terminal is such that a number of the tones fall outside of the correlation bandwidth. An example of this is shown with respect to FIG. 4. Here frequencies f1 to f5 of a cluster of tones including f1 to f8 fall within a first correlation bandwidth cw1. As a consequence, all of these tones are substantially treated the same by the channel. However, tones f6 to f8 are treated differently. The present invention can adapt to this situation as well. In particular, as a primary matter the downlink tones can be grouped into subsets of consecutive tones, e.g., M tones where M is an odd number such that M×(tone spacing) is less than the correlation bandwidth. Then, one of the M tones is S selected as the pilot tone. The calculation can then be performed with respect to the pilot tones related to the group of tones within the correlation bandwidth. A second pilot tone can be associated with another group of tones outside of the first correlation bandwidth. This pilot tone can then be subjected to analysis at the terminal in a similar manner. The transmission processing circuitry can then be adjusted to take into account the analysis of the pilot tones within and outside of the correlation bandwidth. This further enhances the operational characteristics of the transmission/receiver system.

The use of multiple pilot tones also permits the signal processing circuits to interpolate traffic tones to estimate lost or degraded traffic tones. In this circumstance the relationship between pilot tones can be used to predict actual traffic tones from the received tones that have been subjected to the path-loss characteristics of the channel(s).

Throughout the examples described above the base station is described as having two transmit antennae. It should be recognized that the base station could utilize more than two antennae. In such circumstances additional pilot tones would be provided for each antenna. The processing circuitry at the terminal would then be modified to adapt to the fact that multiple pilot tones, that is more than two pilot tones would be processed to understand the relationship of signaling from the more than two antennae. Any of the three transmission processing operations described above can be adapted to the embodiment where more than two transmit antenna are utilized.

The present invention employs the characteristics of OFDM signals with transmit diversity and feedback from a terminal so as to enhance the reception of information signals at the wireless communication terminal in a manner that is similar to providing receiver diversity. As a consequence, such path loss characteristics as fading can be more readily detected and compensated for in connection with the wireless communications.

What is claimed is:

1. A method for enhancing communication reception at a wireless communication terminal, the method comprising the steps of:

transmitting, from a first antenna, a first multi-carrier signal including N tones, N being an integer greater than 1, the N tones including at least one pilot tone;

transmitting, from a second antenna, a second multi-carrier signal including a plurality of tones the plurality of tones including at least one pilot tone;

receiving a feedback signal from a wireless communication terminal, said feedback signal being representative of a processing of the at least one pilot tone of the first multi-carrier signal and the at least one pilot tone of the second multi-carrier signal;

processing at least one of said first multi-carrier signal and said second multi-carrier signal in response to said feedback signal received from the wireless communication terminal; and adapting transmission of communication involving the first multi-carrier signal and the second multi-carrier signal in accordance with the received feedback signal.

2. The method of claim 1 wherein said step of processing comprises the substeps of:

selecting said first multi-carrier signal; and de-selecting said second multi-carrier signal.

3. The method of claim 1 wherein said step of processing comprises the step of adjusting the phase of said second multi-carrier signal with respect to said first multi-carrier signal.

4. The method of claim 1 wherein said step of processing comprises the steps of:

applying a weighting factor to each of said first multi-carrier signal and said second multi-carrier signal wherein said weighting factor includes amplitude and phase adjustment components and adjusting the weights to maximize a received power for a given transmit power.

5. The method of claim 1, comprising the further steps of transmitting a multi-carrier signal from each of N additional antennae, N being greater than or equal to 1, each multi-carrier signal including a pilot tone; and processing each multi-carrier signal in response to said feedback signal wherein said feedback signal includes representation of a processing of the pilot tones of each multi-carrier signal.

6. A method for enhancing communication reception at a wireless communication terminal, the method comprising the steps of:

transmitting a first signal including N multicarrier tones from a first antenna, N being an integer greater than 1;

transmitting a second signal including at least one pilot tone from a second antenna, said pilot tone corresponding to one of said N multi-carrier tones;

receiving a feedback signal based on an analysis of the first signal and second signal as received at a wireless terminal and;

adapting transmission of communication involving the N multi-carrier tones in accordance with the received feedback signal.

7. The method of claim 6 wherein said second signal includes a plurality of information carrier tones.

8. The method of claim 7 wherein said step of processing comprises the substeps of:

selecting either said first signal or said second signal; and deselecting the signal not selected in said selecting step.

9. The method of claim 7 wherein said step of processing comprises the step of adjusting the phase of said second signal with respect to said first signal.

10. The method of claim 7 wherein said step of processing comprises the steps of:

applying a weighting factor to each of said first signal and said second signal wherein said weighting factor includes amplitude and phase adjustment components and adjusting the weights to maximize a received power for a given transmit power.

11. A method for enhancing wireless communication reception at a terminal, the method comprising the steps of:

transmitting a first data frame signal including N multi-carrier tones from a first antenna, N being an integer greater than 1, at least one of which is a pilot tone;

transmitting, in a second frame signal data, a pilot tone from a second antenna, said pilot tone corresponding to one of said N multi-carrier tones wherein said pilot tone falls within a first correlation bandwidth of said N multi-carrier tones;

receiving a feedback signal indicative of reception at the terminal of the transmissions; and processing a communication to be transmitted to the terminal in accordance with the feedback signal.

12. The method of claim 11 comprising the further steps of:

transmitting a third data frame signal including said multi-carrier tones from said first antenna, including at least one pilot tone falling outside said first correlation bandwidth of said N multi-carrier tones; and transmitting in a fourth data frame signal from said second antenna, a pilot tone corresponding to one of said N multi-carrier tones falling outside said first correlation bandwidth, wherein said feedback signal is indicative of reception of said pilot tones in said third data frame signal and said fourth data frame signal.

13. The method of claim 12 comprising the further step of estimating at least one of said N multi-carrier tones by interpolating two or more of said N multi-carrier tones using reception information regarding at least two pilot tones.

14. A method for enhancing wireless communication reception at a plurality of terminals, the method comprising the steps of:

providing a multicarrier signal of X tones where X is an integer and X>2;

creating Y clusters of tones from said X tones where Y is an integer $2 \leq Y \leq X$ each cluster including N carrier tones where N is an integer $\geq 1$; and for each cluster of carrier tones, transmitting from a first antenna a first subset of the cluster's carrier tone, one of said tones constituting a first pilot tone;

transmitting from a second antenna a second subset of the cluster's carrier tones one such tone constituting a second pilot tone;

receiving a feedback signal from one of the plurality of terminals, said feedback signal being representative of a processing of the first and second pilot tones; and processing said cluster of carrier tones in response to said feedback signal.

15. A system for providing enhanced communication reception at a wireless communication terminal, the system comprising:

a first transmission antenna;

a second transmission antenna;

a receiver antenna;

a multi-carrier tone generator;

a feedback reception circuit coupled to the receiver antenna; and a processing circuit coupled to said feedback reception circuit, said multi-carrier tone generator and said first and second transmission antennae such that transmission by the first and second transmission antennae of multi-carrier tones generated by the generator is affected by a feedback signal from a wireless communication terminal received by said feedback reception circuit.

16. A system for improving communication transmission from a base station to a wireless communication terminal, the system comprising:

a complex data source;

a multi-carrier tone generator;

a first transmission antenna;

a first transmission processing path coupling said complex data source, said multicarrier tone generator and said first transmission antenna;

a second transmission antenna;

a second transmission processing path coupling said complex data source said multi-carrier tone generator and said second transmission antenna;

a feedback reception circuit; and processing control circuitry coupled to said feedback reception circuit, said first transmission processing path and said second transmission processing path, said processing control circuitry affecting the coupling of the complex data source and the multi-carrier tone generator to said first transmission antenna and said second transmission antenna in response to said feedback reception circuit.

17. A system for improving communication transmission from a base station to a wireless communication terminal, the system comprising:

N transmission antennae where N is an integer and $N \geq 2$;

a receiver antenna;

a multi-carrier tone generator;

a feedback reception circuit coupled to the receiver antenna; and a processing circuit coupled to said feedback reception circuit, said multi-carrier tone generator and said N transmission antennae such that transmission by the N transmission antennae of multi-carrier tones generated by the generator is affected by a feedback signal from a wireless communication terminal received by said feedback reception circuit.

* * * * *